United States Patent [19]

Palansky et al.

[11] Patent Number: 5,341,703
[45] Date of Patent: Aug. 30, 1994

[54] PERFORMANCE MODE AND ECONOMY MODE SHIFT SCHEDULING IN AN AUTOMATIC TRANSMISSION

[75] Inventors: Bruce J. Palansky, Livonia; Thomas L. Greene, Plymouth; John A. Daubenmier, Canton; Paul F. Smith, Dearborn Heights, all of Mich.; Karl H. Kock; Stuart L. Bird, both of Cologne, Fed. Rep. of Germany; Gavin F. McCall, Witham, England

[73] Assignee: Ford Motor Company, Dearborn, Mich.

[21] Appl. No.: 27,514

[22] Filed: Mar. 4, 1993

[51] Int. Cl.⁵ .............................. B60K 41/18
[52] U.S. Cl. .................... 477/65; 477/120; 477/905
[58] Field of Search ................. 74/866; 364/424.1

[56] References Cited

U.S. PATENT DOCUMENTS

| | | |
|---|---|---|
| 4,111,072 | 9/1978 | Harmon et al. . |
| 4,338,666 | 7/1982 | Suzuki et al. . |
| 4,350,057 | 9/1982 | Kishi et al. . |
| 4,367,812 | 1/1983 | Kobayashi et al. . |
| 4,474,081 | 10/1984 | Kinugasa et al. . |
| 4,523,281 | 6/1985 | Noda et al. . |
| 4,564,906 | 1/1986 | Stephan et al. . |
| 4,669,335 | 6/1987 | Matsuoka et al. . |
| 4,679,145 | 7/1987 | Beeck et al. . |
| 4,688,450 | 8/1987 | Hayashi et al. . |
| 4,718,310 | 1/1988 | Shindo et al. . |
| 4,722,249 | 2/1988 | Harada et al. . |
| 4,733,580 | 3/1988 | Kubo et al. . |
| 4,807,497 | 2/1989 | Yasue et al. . |
| 4,815,341 | 3/1989 | Ohkubo et al. . |
| 4,823,642 | 4/1989 | Iwaki et al. . |
| 4,853,720 | 8/1989 | Onari et al. . |
| 4,899,280 | 2/1990 | Onari et al. . |
| 4,926,328 | 5/1990 | Funatsu et al. . |
| 5,031,100 | 7/1991 | Takahashi . |
| 5,035,159 | 7/1991 | Shibayama . |
| 5,038,287 | 8/1991 | Taniguchi et al. . |
| 5,040,114 | 8/1991 | Ishikawa et al. . |
| 5,081,886 | 1/1992 | Person et al. . |
| 5,126,940 | 6/1992 | Haubner ........................ 364/424.1 |
| 5,157,991 | 10/1992 | Sumimoto ........................... 74/866 |
| 5,189,931 | 3/1993 | Suzuki ................................. 74/866 |
| 5,231,582 | 7/1993 | Takahashi et al. ............. 364/424.1 |
| 5,234,876 | 8/1993 | Minowa et al. ..................... 74/866 |
| 5,267,158 | 11/1993 | Sakaguchi et al. ................. 74/866 |

Primary Examiner—John T. Kwon
Attorney, Agent, or Firm—Frank G. McKenzie; Roger L. May

[57] ABSTRACT

A system for scheduling gear ratio changes in an automatic transmission and controlling operation of a torque converter bypass clutch includes a microprocessor; electronic memory containing control algorithms, lookup tables, functions and constants; solenoid-operated shift valves, a variable force solenoid, friction clutches, brakes and sensors, and planetary gear units. A table of calibrated performance weighting factors (PWF) is used to alter reference schedules of gear ratio changes based on the extent to which high performance operation is desired rather than economy operation. The PWFs are used to adjust gear shift points based on inferences drawn from engine throttle position and time rate of change of throttle position. Hydraulic pressure supplied to the friction elements and the schedule of unlocked and modulated operation of the torque converter are adjusted from reference schedules and pressures on the basis of PWF values.

8 Claims, 6 Drawing Sheets

PERFORMANCE MODE AND ECONOMY MODE SHIFT SCHEDULING IN AN AUTOMATIC TRANSMISSION

BACKGROUND OF THE INVENTION

1. Field of the Invention

This invention pertains to the control of upshifts and downshifts of an electronically-controlled automatic transmission. More particularly, the invention pertains to scheduling gear ratio changes on the basis of inferences drawn from current use of the vehicle engine and transmission.

2. Description of the Prior Art

Conventionally an electronically-controlled automatic transmission is provided with a gearshift schedule that defines when each gear ratio change is to occur on the basis of current engine throttle position and vehicle speed. Generally, data from lookup tables stored in electronic memory relating vehicle speed and engine throttle position, for each of the gear ratio changes, are used to produce a signal representing the desired gear ratio. When the desired gear ratio is different from the current gear ratio, a command signal is produced by the control to cause a change in state of solenoid-operated shift valves and a reduction of torque carried by an off-going friction element and an increase of torque carried by an on-coming friction element. This changes the state of the planetary gear units and cause the gear ratio to change.

Generally a reference schedule of gearshift boundaries, expressed in terms of vehicle speed and engine throttle position, is stored in memory. The schedule is continually referenced and used to produce an upshift signal or downshift signal when a boundry is crossed.

U.S. Pat. Nos. 4,669,335; 4,807,497; and 4,823,642 describe a switch used by the vehicle operator to signify preference for the transmission to be operated in economy mode or performance mode. The state of the mode switch is used as input information by a microprocessor so that decisions to change gear ratios are made with reference to a first standard gearshift schedule whose shift points are established for use in the economy mode and a second schedule for use in the performance mode. U.S. Pat. Nos. 4,338,666; 4,350,057; 4,474,081; 4,584,906; 4,679,145; and 4,733,580 disclose transmission control techniques wherein the gearshift schedule corresponding to either economy or performance mode of operation is automatically selected on the basis of vehicle operating parameters.

In certain driving conditions, when the engine throttle pedal is depressed quickly with the vehicle traveling at about 60 mph, the driver demands more power for fast acceleration. The gearshift schedule would be established to produce a downshift when the throttle position exceeds the throttle position that maintains 60 mph vehicle speed on a level road. However, in certain other vehicle operating situations, the vehicle may be required to cruise at various loads, especially at high loads above 60 mph. The gearshift schedule described above will produce frequent unwanted downshifts under those conditions.

To avoid this problem multiple gearshift schedules should be defined that satisfy driver demands for current driving condition. Use of a mode switch to change between specific shift schedules is one technique for providing increase flexibility to accommodate greatly different driver expectations and demands in use of the same vehicle.

SUMMARY OF THE INVENTION

It is an object of this invention to provide a transmission control system that produces gear ratio changes, operates a torque converter bypass clutch and adjusts hydraulic pressure supplied to the friction elements of the transmission in a way that is compatible with the degree to which the motor vehicle is being operated between an economy mode and high performance mode. The control infers the desired operating mode from the engine throttle position and time rate of change of the engine throttle, or the desired mode is taken from the state of a mode selection switch operated by the driver and inferences derived from throttle position and its rate of change.

A system for scheduling gear ratio changes in an automatic transmission and controlling operation of a torque converter bypass clutch includes a microprocessor; electronic memory containing control algorithms lookup tables, functions and constants; solenoid-operated shift valves, a solenoid for changing the magnitude of bypass clutch pressure, friction clutches, brakes and sensors, and planetary gear units. A table of calibrated performance weighting factors (PWF) is used to alter reference schedules of gear ratio changes based on the extent to which high performance operation is desired rather than economy operation. The PWFs are used to adjust gear shift points based on inferences drawn from engine throttle position and time rate of change of throttle position. Hydraulic pressure supplied to the friction elements and the schedule of unlocked and modulated or soft lock operation of the torque converter are adjusted from reference schedules and pressures on the basis of PWF values.

An advantage of operating a transmission according to this invention is the avoidance of changing the gearshift schedule such that gear ratio changes occur with less hysteresis than is present in the reference gearshift schedules, thereby avoiding unanticipated, unwanted or unnecessary gear ratio changes.

The control algorithms allows the calibrator to alter the quality of the shift schedule to either maintain high shift quality in the performance mode and normal mode or to accentuate differences between those modes. When an operating mode switch is used in connection with the control algorithms, the PWF values, determined from the tables corresponding to the selected operating mode, allow the control system to respond to requests for performance even when the normal mode is manually selected. Conversely, the PWF values provide an economical bias to the performance mode operation provided the operating characteristics indicate it is appropriate.

DESCRIPTION OF THE PREFERRED EMBODIMENT

Figure 1A:
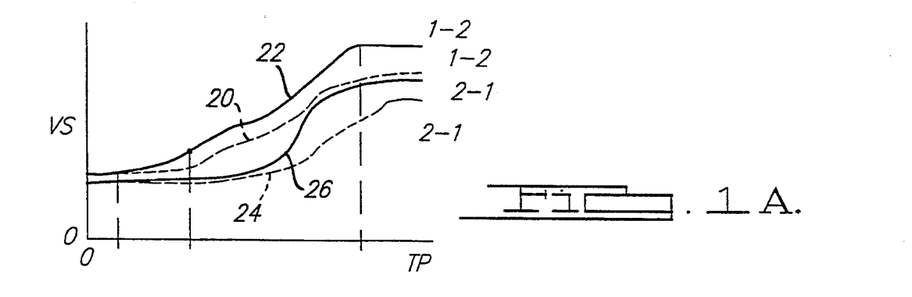
FIG. 1A is a graph showing the lines that define, in terms of the relationship between vehicle speed and throttle position, where upshifts and downshifts are made in the performance mode and normal mode of operation.

In FIG. 1A, line 20 defines the relationship between vehicle speed (VS) and engine throttle position (TP) where gear ratio changes from a first gear ratio to a second gear ratio occur while a transmission is operating in a normal or economy mode. Line 22 represents the same relation while the transmission is operating in a performance mode. Line 24 represents the relation between vehicle speed and throttle position when downshifts from the second speed ratio to the first speed ratio occur while the transmission is operating in the economy mode. Line 26 shows the relation between the same variables when downshifts from the second speed ratio to the first speed ratio while the transmission operates in the performance mode.

Figure 1B:
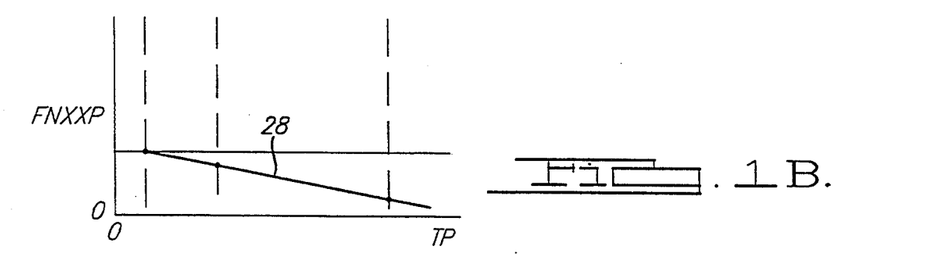
FIG. 1B is a graph showing the variation of the difference in vehicle speed over the range of throttle position between an upshift made in the performance mode and the same upshift made in the normal mode.

From FIG. 1A it can be seen that upshifts occur later in the performance mode than in the normal mode since, in the performance mode, upshifts occur when vehicle speed is greater than normal mode vehicle speed at the same throttle position. This vehicle speed difference, the function FNXXP, varies over the range of throttle position, as illustrated in FIG. 1B, and is stored in electronic memory. In FNXXP, "XX" signifies the appropriate upshift or downshift, such as a 1-2 upshift or a 2-1 downshift.

From FIG. 1A it can be seen that downshifts occur earlier in the performance mode than in the normal mode since, in the performance mode, downshifts occur when throttle position is less than normal mode throttle position for a given vehicle speed.

Performance weighting factors (PWF), determined by calibration, i.e., by driving a specific vehicle incorporating the engine and automatic transmission being calibrated, determine the extent to which gear shift schedule varies between normal mode of operation and performance mode. For example, with reference to the tables of FIGS. 2 and 3, when the throttle is in the vicinity of closed throttle, the position corresponding to the lefthand side of the tables, and the current time rate of change of the engine throttle is in the vicinity of 0, corresponding to the lower vertical side of the tables, the economy or normal mode of operation is emphasized by filling the table near corners 30 and 34 with values that are 0.0 or nearly zero. However, at the opposite extremity of engine throttle position and engine throttle rate, i.e., at the upper righthand corners 32, 36 of the tables, the performance weighting factors are in the vicinity of 1.0 resulting in a shift schedule that emphasizes performance mode of operation.

Figure 2:
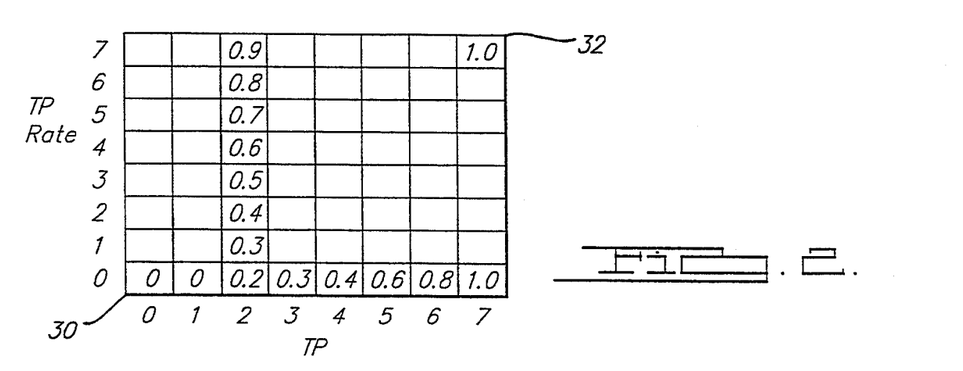
FIG. 2 is a table relating engine throttle position and the time rate of change of engine throttle position, the table being filled with performance weighting factors corresponding to operation in the normal or economy mode.

At the lower range of engine throttle rate in the normal mode table, FIG. 2, PWF increases steadily with throttle position from 0.0 to 1.0. Similarly, the PWF values at a particular engine throttle position increase steadily with engine throttle rate as shown in the vertical column of numbers written above engine throttle position 2. Table 2 is entirely filled with calibrated performance weighting factors.

Figure 3:
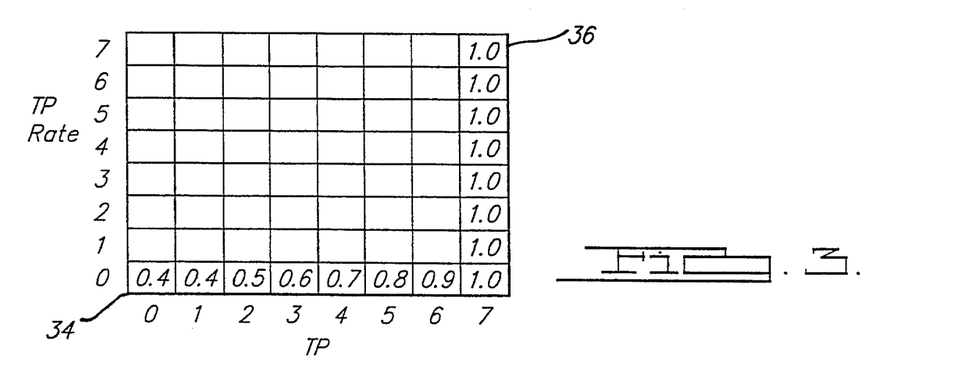
FIG. 3 is a table relating engine throttle position and the time rate of change of engine throttle position, the table being filled with performance weighting factors corresponding to operation in the performance mode.

The table of FIG. 3 is similarly filled with performance weighting factors whose values increase in magnitude as described with respect to those of FIG. 2, except that overall the magnitude of the factors is somewhat higher for a given combination of engine throttle position and engine throttle rate. For example, the minimum PWF value in the table at the lower lefthand corner may be 0.40 instead of 0.0 and the PWF values will increase more quickly in FIG. 3 than they increase in FIG. 2 as throttle position increases to its maximum count.

Figure 5:
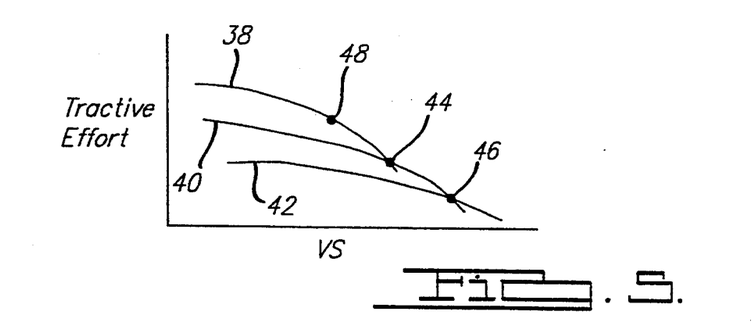
FIG. 5 is a graph showing the general shape of tractive effort versus vehicle speed for various speed ratios.

To calibrate the performance weighting factors for use in the performance mode table, theoretical guidance is shown graphically in FIG. 5 by the relationship between tractive effort, the force on the road surface required to move the vehicle, and vehicle speed. Curves 38, 40 and 42 represent the variation of tractive effort over the range of vehicle speed for operation in the first speed ratio, second speed ratio and third speed ratio, respectively. Theoretically, the performance weighting factor can be established at points 44, where the first speed ratio curve crosses the second speed ratio curve, and at point 46, where the second speed ratio curve crosses the third speed ratio curve.

Performance weighting factors are established for the normal mode of operation with a view toward minimizing noise, vibration and harshness of the powertrain and to avoid a condition called "lugging." In FIG. 5, point 48 represents an approximate position on the tractive effort curve where a normal mode gear ratio change occurs for an upshift from the first speed ratio to the second speed ratio.

The control strategy according to this invention can be used when an input signal produced by a switch 52 is used to produce an input signal to a microprocessor 50, the state of the switch being determined by the vehicle operator by selecting performance mode operation or normal mode operation. When such a switch is used, two PWF tables are stored in an electronic memory 62 and the corresponding PWF values are taken from those tables, one table containing the factors for the normal mode the other table containing the factors for use when the selector switch 52 is set to the performance mode. Alternatively, when no mode switch is available, one PWF table is used and that table is filled with PWF values that accommodate both normal mode and performance mode of operation.

Figure 4A:
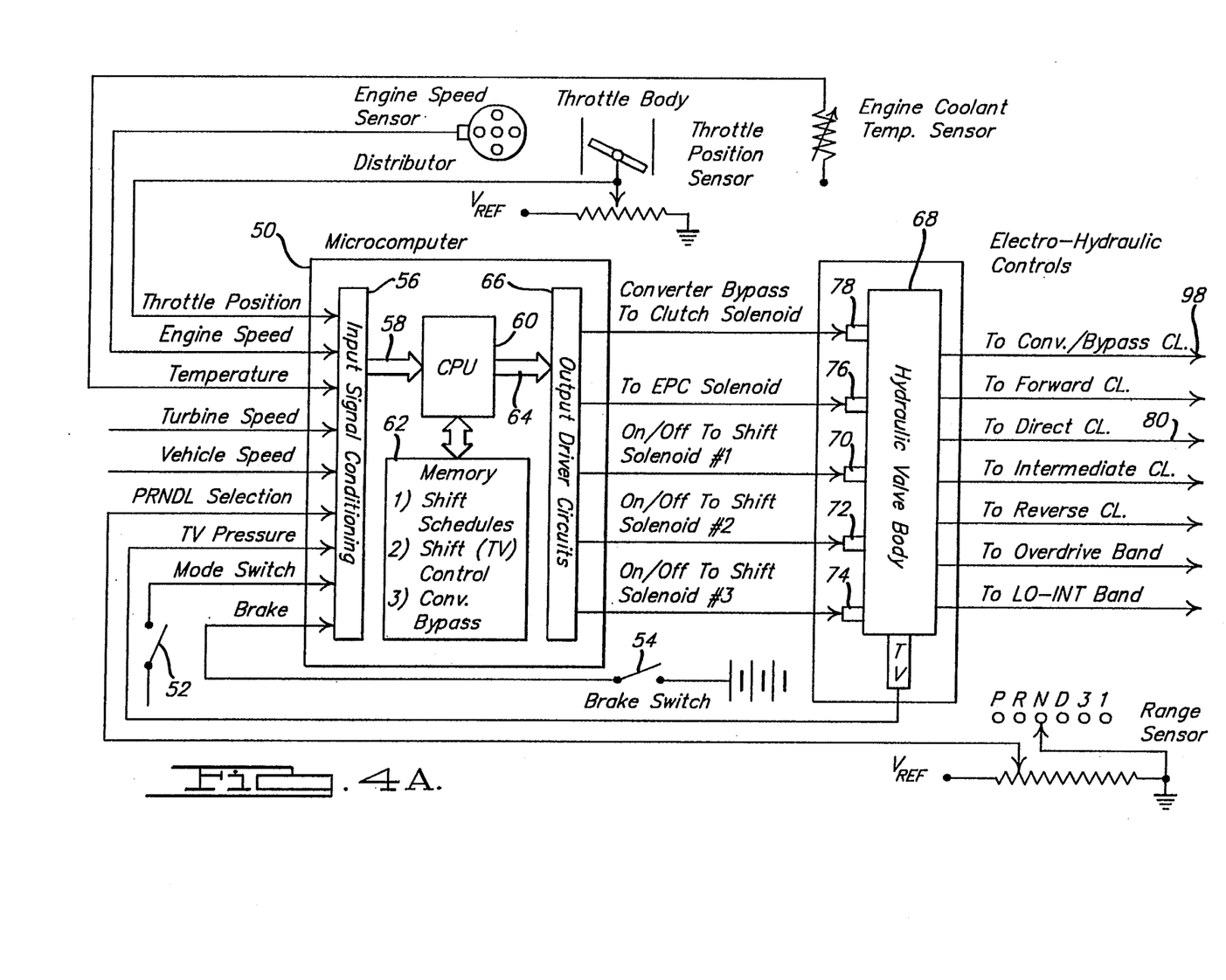
FIG. 4A is a schematic representation of a microprocessor, electronic memory, input signals produced by sensors representing the current state of various operating parameters, and output signals used to control the components of an automatic transmission.

The microprocessor 50 shown in FIG. 4 is an integrated central processor supplied with signals representing engine throttle position, engine speed, engine coolant temperature, torque converter speed, vehicle speed, the selected range of the gear selector throttle valve pressure, the state of the selected transmission operating mode switch 52, the state of a brake switch 54 and other information. Information conveyed by these input signals is conditioned by input conditioning circuitry 56 and transmitted on data bus 58 to a central processing unit 60 accessible to electronic memory 62. The memory contains control algorithms for use in shift scheduling and converting throttle valve pressure to an electronic pressure control EPC signal and data pertaining to the control of a torque converter bypass clutch 98. The central processing unit recalls information and control algorithms from electronic memory 62, executes the algorithms and produces output carried on data bus 64 to output driver circuits 66, which produce electronic signals. The output signals drive electrical solenoid-operated valves located in an hydraulic valve body 68 and electronic components adapted to respond to the output signals.

The processor executes transmission control programs stored in read-only-memory (ROM) and recalls variables, functions and tables stored in ROM. The results of logical and arithmetic computations executed by the processor are stored in RAM where it is addressed, fetched, erased, rewritten or changed in accordance with the control logic of the control algorithms.

Data that are stored in memory include shift schedule information and lookup tables, in which two variables such as throttle position and vehicle speed are mutually related and stored by reference to a particular gear ratio. The data stored in memory also include functions, in which a first variable is used to select from memory a corresponding variable, and constants.

The algorithms that control operation of the transmission are divided into several routines or control modules executed sequentially in a known fashion during each background pass. The algorithms of each module are executed sequentially just as the modules themselves are executed sequentially. Various data registers are initialized as input data from the previously mentioned sensors become available at the input ports of the processor. Information that results from the sensor input data and information stored in memory and learned from previous executions of the background passes are used during execution of the control algorithms to produce electronic signals present at the output ports of the processor. Output signals drive on/off shift solenoid-operated shift valves, 70, 72, 74, a variable force TV solenoid valve 76 and a torque converter bypass clutch solenoid 78.

Figure 4B:
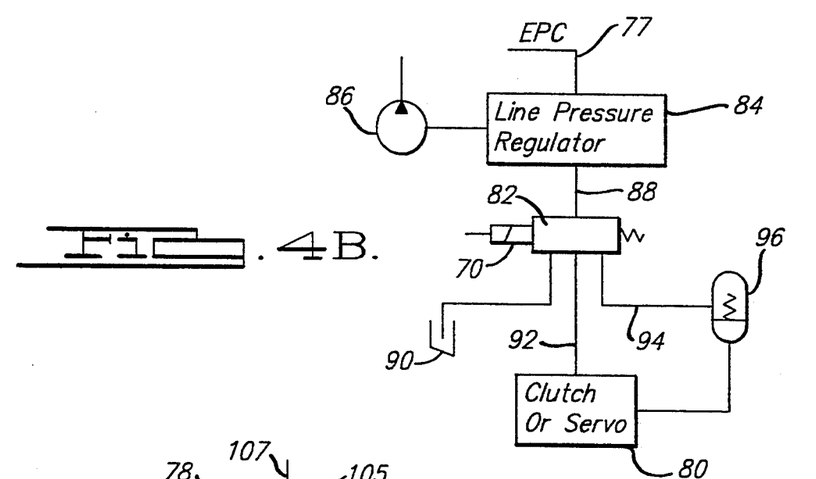
FIG. 4B is a schematic diagram of a portion of an hydraulic control system.

In FIG. 4B the friction elements, such as a clutch, brake or servo 80, are pressurized and vented through operation of the shift valve 82, each shift valve being controlled by one of the on/off shift solenoids 70, 72 or 74. Electronic control pressure EPC in line 77 is applied to line pressure regulator valve 84, which is supplied with hydraulic fluid from a fluid pressure source, such as pump 86. Regulated line pressure, carried in line 88, is directed by valve 82 subject to the control of solenoid 70 to an exhaust 90 when friction element 80 is to be disengaged, directly through line 92 to friction element 80 when it is to be held engaged and the gear ratio maintained, or through line 94 and accumulator 96 to the friction element when a gear ratio change is to be made that requires pressurizing the friction element. The state of solenoids 70, 72, 74 changes when a gear ratio change is commanded and the friction elements are engaged and released in accordance with the state of those solenoids.

Figure 4C:
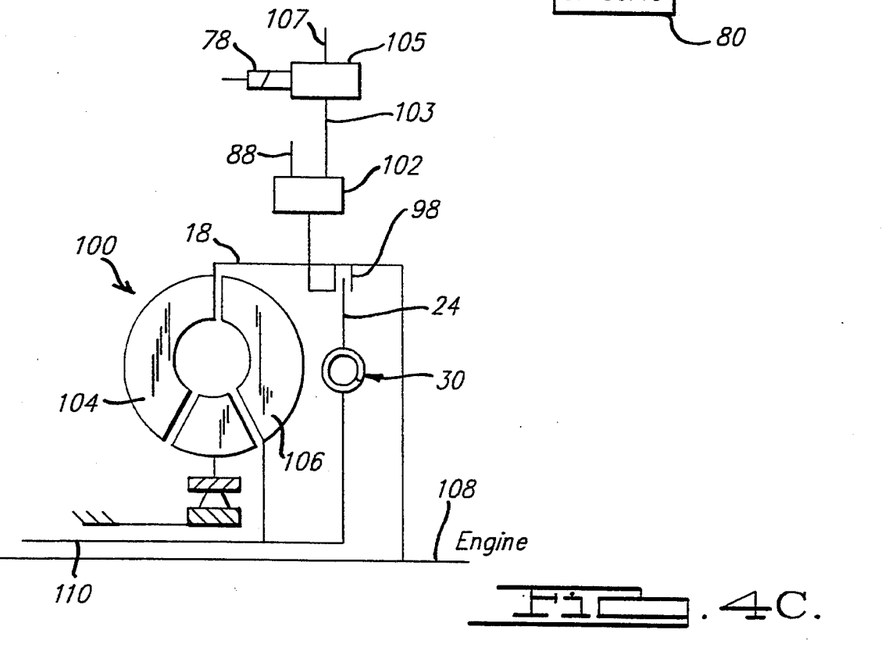
FIG. 4C is a schematic diagram of a portion of an hydraulic system and a torque converter having a bypass clutch.

Referring now to FIG. 4C, the lockup clutch 98 of a torque converter 100 is alternately unlocked or modulated by directing hydraulic fluid through bypass clutch control valve 102, which is supplied with regulated line pressure from valve 84 and a variable pressure in line 103. Valve 105 is supplied with constant pressure in line 107 from a solenoid pressure regulator valve and is controlled by a pulse width modulated PWM signal applied to solenoid 78. Valve 102 produces a pressure difference across bypass clutch 98. When clutch 98 is engaged, a direct mechanical connection between impeller 104 and turbine 106 is produced. The impeller of torque converter 100 is driven from the crankshaft 108 of an engine, and turbine 106 drives a transmission input shaft 110. When clutch 98 is disengaged the turbine is driven hydrodynamically by the impeller.

EPC is an hydraulic pressure produced as a result of the output signal from microprocessor 50 that drives EPC solenoid 76. Line pressure throughout the hydraulic control circuit and the pressure applied to the various clutches, brakes and servos that are selectively engaged and disengaged to produce the various speed ratios of the transmission are a result of the EPC pressure.

U.S. Pat. No. 5,157,608 describes a technique for determining the magnitude of EPC pressure. As the transmission upshifts and downshifts among the various speed ratios, the torque capacity of the various clutches and servos that are held and released to produce the gear ratios changes in accordance with the magnitude of torque produced by the engine, the operating state of the torque converter, the torque converter speed ratio, vehicle speed, engine speed and other operating parameters. The magnitude of EPC is established in accordance with the torque capacity requirements of the friction elements.

Figure 6:
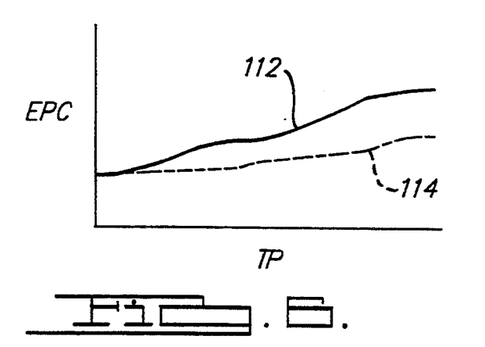
FIG. 6 is a graph representing the electronic pressure control over a range of engine throttle position for a particular gear ratio change.
Figure 7:
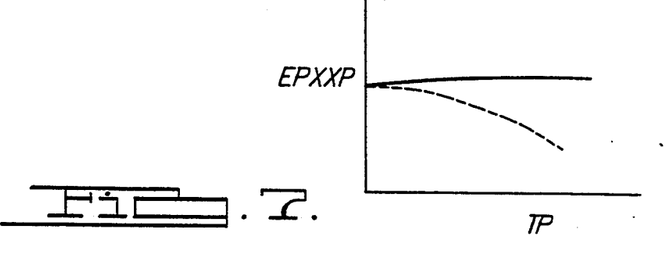
FIG. 7 is a diagram representing the difference in electronic pressure control magnitude over a range of throttle position corresponding to the gear ratio change of FIG. 6.

The control according to the present invention is capable of producing an infinite number of boundary lines among adjacent gear ratios in accordance with the extent of which the control senses the operator's desire to operate in performance mode or economy mode. Accordingly, EPC varies over the range of engine throttle positions represented by the performance mode curve 112 and the normal or economy mode curve 114 shown in FIG. 6. From the data of FIG. 6, an incremental EPC function EPXXP, the difference between EPC magnitude of curve 112 and curve 114, is defined over the full range of engine throttle as shown in FIG. 7. When the operative shift schedule is altered from the normal mode shift schedule, a corresponding change is made to EPC pressure so that friction element pressures maintain the high quality of the gear shifting that results when the transmission operates in economy mode. Alternatively, a harsher shift can be produced using suitably calibrated PWF values.

Figure 8:
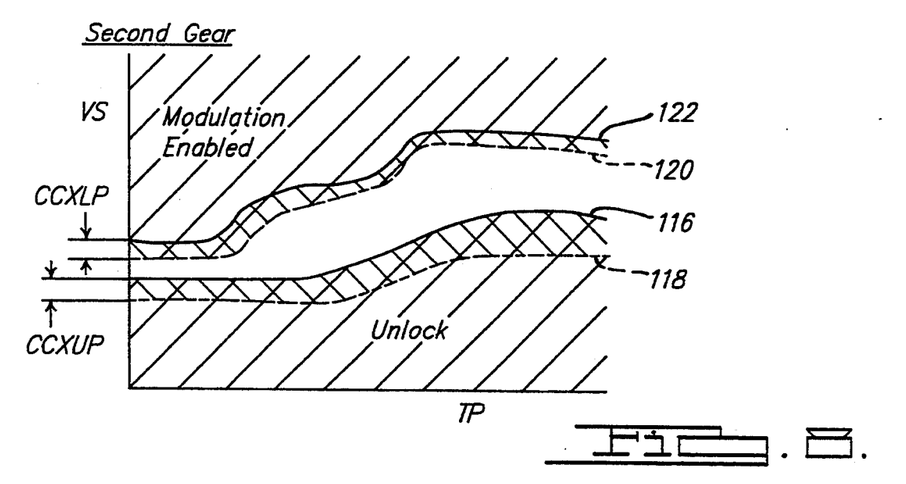
FIG. 8 is a graph showing a schedule that defines, in terms of vehicle speed and throttle position, the state of a torque converter bypass clutch.

FIG. 8 represents data from a lookup table stored in electronic memory relating vehicle speed and engine throttle position, each such table corresponding to a particular gear ratio. When the transmission is operating in performance mode, line 116 represents the upper range of vehicle speed, below which the torque converter 100 is unlocked by disengaging lockup clutch 98. The corresponding curve 118 for normal or economy mode of operation defines the upper limit of vehicle speed, below which the torque converter bypass clutch 98 is unlocked. In a way similar to that which was discussed previously, the vehicle speed difference between curves 116 and 118 at each throttle position is an incremental function CCXUP stored in electronic memory.

Curve 120 defines the lower limit of vehicle speed over the range of engine throttle positions, above which vehicle speeds the bypass clutch 98 is modulated or locked while the transmission is operating in the normal mode. Line 122 defines the corresponding lower limit of vehicle speed for the performance mode. The vehicle speed difference between curves 120 and 122 at each throttle position is a function CCXLP stored electronic memory.

When the vehicle is operating in the range between curves 122, 116 and between curves 120, 118, there is no change in the state of bypass clutch 98. This range represents a hysteresis zone in which the current state of clutch 98 is maintained.

Figure 9:
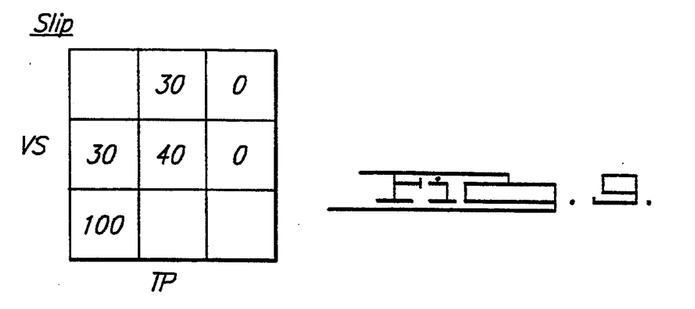
FIG. 9 is a table containing slip values corresponding to values of vehicle speed and throttle position.

The magnitude of slip across torque converter bypass clutch 98 is a function stored in electronic memory in a lookup table whose matrix is populated with magnitudes of slip, the difference in rotational speed across clutch 98. The value of slip for the current condition is determined by accessing the table of FIG. 9 with the variables, vehicle speed and engine throttle position.

Since response to driver commands for performance must be provided quickly, after each execution of the transmission control modules, if the PWF value increases over its previous execution value, the new PWF value immediately becomes the commanded value. However, when an execution of a control algorithm produces a PWF value that is lower than the previous PWF value, the commanded PWF value is determined on the basis of the output of a rolling average filter having a time constant that provides an exponential decrease in the PWF value to the value determined from the tables of FIGS. 2 and 3. The value so determined in the filtered PWF_DES.

In order to avoid frequent upshifts and downshifts between adjacent gear ratios, the control logic prevents the current PWF value from reducing hysteresis between adjacent upshift and downshift curves from the amount of hysteresis present in the reference performance mode and normal mode, such as those illustrated in FIG. 1A. The control algorithm produces this effect by storing in memory the PWF value when the most recent downshift was made, PWF_AT_DS and referring to that value in the process of determining the current PWF value. The algorithms described below implement this strategy.

Figure 10:
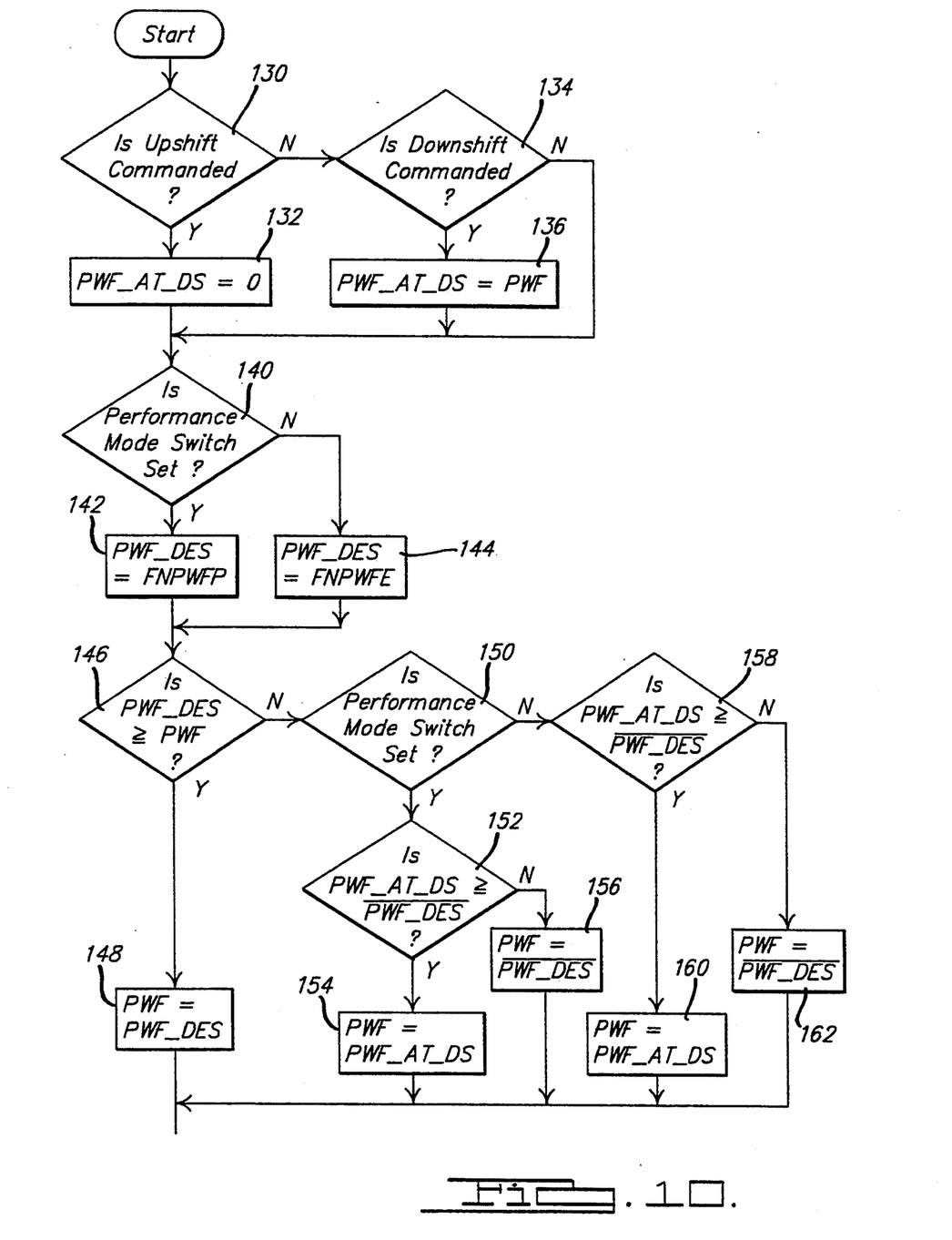
FIGS. 10, 11, and 12 are diagrams that illustrate operation of control logic for use with this invention.

During each execution of the background loop a transmission control module is executed to determine the performance weighting factor that applies to current operating conditions. An inquiry is made at 130 to determine whether the control algorithm has commanded an upshift from the current operating gear ratio. If an upshift is currently commanded, the performance weighting factor corresponding to the previous downshift, PWF_AT_DS, is set equal to zero at 132. If an upshift is not commanded, an inquiry is made at 134 to determine whether a downshift is currently commanded. If neither an upshift nor a downshift is currently commanded, at 142 and 144 the desired PWF value, PWF_DES, is determined from the lookup tables of FIGS. 2 and 3 in accordance with the current state of the performance mode switch, or from a single lookup table if a mode switch is not employed. If a downshift is currently commanded, the PWF_AT_DS is set equal to the current performance weighting factor, which will have been determined from the lookup tables on the basis of the engine throttle position and throttle rate existing at the time when the downshift command was established.

At 140 an inquiry is made to determine the state of the performance mode switch. If the switch is set, at 142 PWF_DES is set equal to the appropriate performance mode value FNPWFP determined from FIG. 3. If the switch is not set, at 144 PWF_DES is set equal to the appropriate economy mode value FNPWFE of FIG. 2. If a mode switch is not used as a part of the control, then the appropriate PWF value is taken from a single table like those of FIGS. 1 and 2.

Control passes to statement 146 where an inquiry is made to determine whether PWF_DES is equal to or greater than the current PWF value. If so, at 148 PWF is set equal to PWF_DES and control passes to the portion of the control algorithms that determines the gear ratio to be commanded. If the 146 test statement is false, a check is made at 150 to determine again the state of the performance mode switch. If the performance mode switch is set, at 152 a test is made to determine whether PWF_AT_DS is greater than or equal to the current filtered value of PWF_DES. If the test at 152 is true, PWF is updated to the value stored in the electronic memory corresponding to the most recent downshift PWF_AT_DS. If the test at 152 is false, at 156 PWF is assigned the filtered value of PWF_DES.

If the test at 150 is false, control passes to 158 where it is determined whether PWF_AT_DS is equal to or greater than the filtered value of PWF_DES. If this test is true, at 160 PWF is updated to the stored value of PWF at the recent downshift. If test 158 is false, PWF is updated at 162 to the filtered value of PWF_DES.

Changes in gear ratio and changes in state of the torque converter bypass clutch 98 are scheduled and executed after vehicle speed is calculated, as described below.

Figure 11:
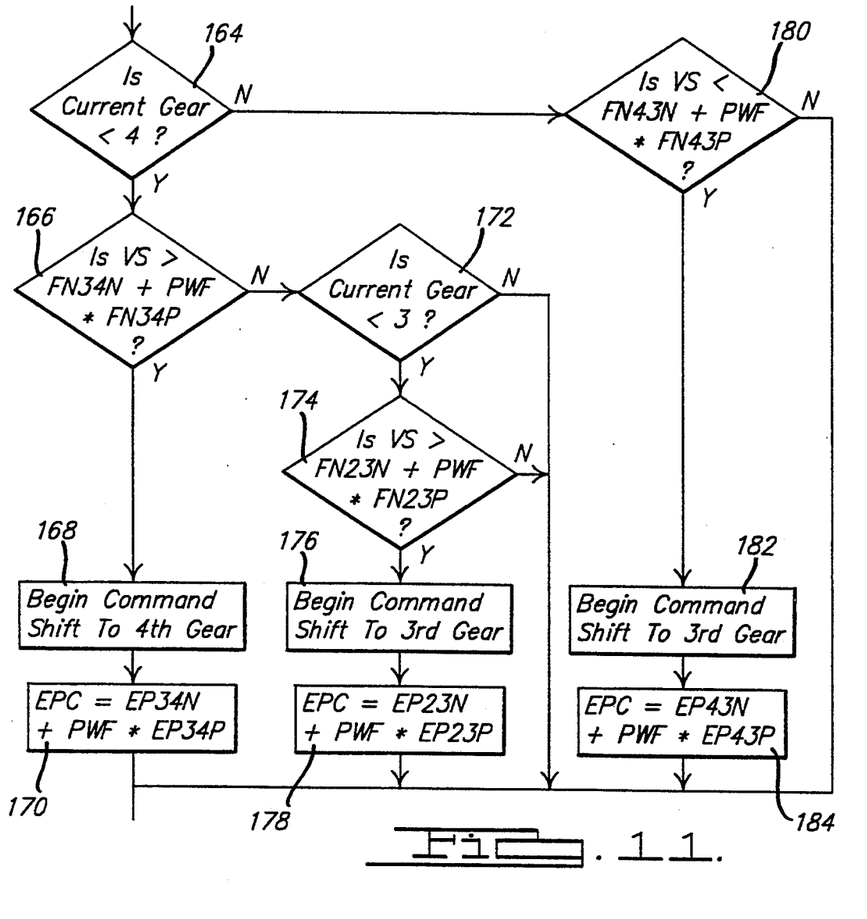

Gear ratio changes occur when $$VS > \text{or} = FNXXN + PWF*FNXXP \qquad (1)$$

where FNXXN is the value of vehicle speed obtained from the normal mode shift schedule for each of the upshifts and downshifts that correspond to the current engine throttle position. FN12N is the vehicle speed where an upshift from the first gear ratio to the second gear ratio is obtained from electronic memory on the basis of the data stored there representing the information illustrated in FIG. 1A for the normal mode of operation and corresponding to the current engine throttle position. FN21N is the same information corresponding to a downshift from the second speed ratio to the first speed ratio. In equation (1), PWF is the value of the performance weighting factor determined by algorithms described with reference to FIG. 11. In equation (2), FNXXP is the ordinate of curve 28 from FIG. 1B, the difference in vehicle speed between the performance mode and normal mode for the appropriate gearshift. For example, FN12P is the difference between the vehicle speeds at a given engine throttle position between curve 22 and curve 20 of FIG. 1A.

The torque converter is modulated or locked when $$VS > \text{ or } = CCXLN + PWF*CCXLP \quad (2)$$

where CCXLN is the normal mode vehicle speed corresponding to the current engine throttle position for each gear ratio, X, the function corresponding to curve 20 of FIG. 8. Electronic memory contains a lookup table containing the information illustrated in FIG. 8. In equation (2), CCXLP is the vehicle speed difference at the current engine throttle position between the performance mode and normal mode values shown in curves 120 and 122 of FIG. 8.

The torque converter is unlocked when $$VS < CCXUN + PWF*CCXUP \quad (3)$$

where CCXUN is the normal mode vehicle speed at the current throttle position for each gear ratio, X, the function corresponding to curve 118 of FIG. 8. In equation (3), CCXUP is the vehicle speed difference between performance mode and normal mode values shown in curves 116 and 118 of FIG. 8.

The magnitude of EPC varies during a shift according to the following relationship $$EPC = EPXXN + PWF*EPXXP \quad (4)$$

where EPXXN is the dynamic EPC pressure function stored in electronic memory for normal mode, as illustrated in curve 114 of FIG. 6 for each possible gear ratio change. For example, EP12N is the dynamic EPC value corresponding to an upshift from the first to the second speed ratio at the current engine throttle position. In equation (4), EPXXP is the incremental EPC function stored in memory, as illustrated in FIG. 7. EPXXP is the difference in EPC value over the range of engine throttle position between normal mode and performance mode values.

An example of how these concepts are used for the control algorithms to determine whether third gear or fourth gear should be commanded and to determine the level of dynamic EPC pressure for the corresponding gearshift is discussed next with reference to the diagram of FIG. 11.

At statement 164 a comparison between the fourth gear ratio and the current gear ratio is made to determine whether the transmission is currently operating below fourth gear. If that test is true, at 166 a test is made to determined whether current vehicle speed, VS, is greater than FN34N+PWF*FN34P. If test 166 is true, control passes to 168 where fourth gear ratio is commanded. At 170, dynamic EPC is set equal to EP34N+PWF*EP34P.

If, as a result of the test made at 166, vehicle speed is below the tested value, an inquiry is made at 172 to determine whether the current gear is below third gear ratio. If that test is false, thereby indicating that the transmission is operating in the third gear ratio, no new gear ratio is commanded and dynamic EPC pressure is unchanged from its current value.

However, if test 172 is true, at 174 a test is made to determine whether the transmission is operating above the 2-3 upshift curve by determining whether the current vehicle speed is greater than FN23N+PWF*FN23P. If that test is false, thereby indicating that vehicle speed is insufficient to cause an upshift to be commanded, no change is made in the magnitude of dynamic EPC pressure nor is a new gear ratio commanded.

If the test at 174 is true, at 176 a command signal issues from the microprocessor indicating that a gear ratio change to the third gear ratio is required. At 178 dynamic EPC pressure is updated to the value EP23N+PWF*EP23P.

If the current operating gear ratio is the top gear ratio, as a result of the inquiry at 164, control passes to 180 to determine whether the current vehicle speed is less than FN43N+PWF*FN43P in order to determine whether a downshift from the fourth gear to the third gear should be commanded. If vehicle speed does not pass test 180, no change in gear ratio is commanded and dynamic EPC remains at its current value. If, however, test 180 is true, a command to downshift to third gear ratio from four gear ratio is made at 182, and dynamic EPC pressure is recalculated at 184 to EP43N+PWF*EP43P so that the electronic pressure control magnitude is compatible with the impending 4-3 downshift.

Figure 12:
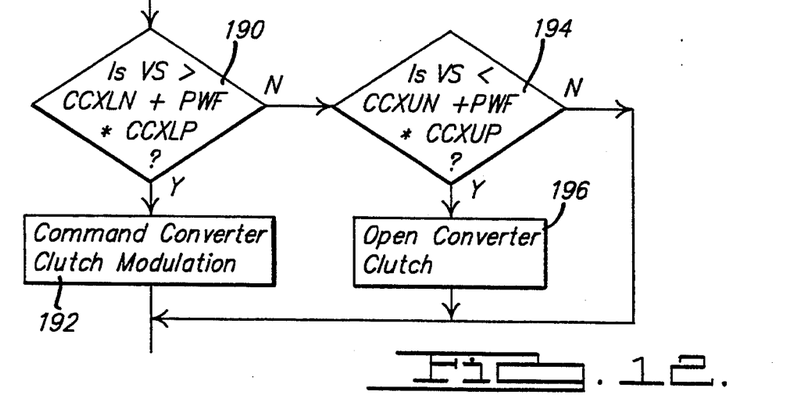

The algorithms for determining whether the torque converter bypass clutch operates in a modulated condition or in an open condition is determined according to the logic described with reference to FIG. 12. At 190, a check is made to determine whether current vehicle speed is greater than the calculated vehicle speed corresponding to the relevant gear ratio and the current throttle position as calculated using equation (2). Vehicle speed VS is compared to (CCXLN+PWF*CCXLP). If test 190 is true, thereby indicating that vehicle speed is greater than the vehicle speed at which the torque converter should be in the soft lock or modulated mode, at 192 a command permitting the torque converter lockup clutch 98 to operate in the modulated mode issues.

If the test at 190 is false, thereby indicating that vehicle speed may be too low to permit the torque converter to operate in the modulated mode, a further test is made at 194 to determine whether vehicle speed is below the magnitude required to unlock the torque converter. At 194 vehicle speed VS is compared to (CCXUN+PWF*CCXUP). If the test at 194 is false, indicating that the torque converter is in the hysteresis range between the modulated range and unlocked range, the current operating state of the torque converter bypass clutch is maintained. If, however, test 194 is true, at 196 a command issues that causes converter clutch 98 to unlock or open.

We claim:

1. A system for controlling gearshifts in an automatic, multiple gear ratio transmission for an automotive vehicle having an engine controlled by the position of an engine throttle comprising:

hydraulically-actuated friction elements selectively engaged and released to produce multiple gear ratios;

a hydraulic circuit having multiple shift control valves for selectively engaging and releasing said friction elements;

means for determining current position of the engine throttle and time rate of change of the throttle;

means for determining current vehicle speed;

means for determining the currently engaged gear ratio;

means for selecting predetermined performance weighting factors PWF having values associated with paired combinations of the current throttle position and current time rate of change of throttle position;

means for establishing first vehicle speeds FNXXN corresponding to the current throttle position at which gear ratio changes are scheduled to occur from each gear ratio when the vehicle is in a reference mode of operation, and for establishing the difference FNXXP between said first vehicle speeds and the vehicle speeds corresponding to the current throttle position at which gear ratio changes are scheduled to occur from each gear ratio when the vehicle is in a second mode of operation;

means for calculating second vehicle speeds corresponding to upshifts and downshifts from the current gear ratio from the relation [FNXXN+(PWF*FNXXP)];

means for commanding a change to a higher gear ratio from the current gear ratio if the current vehicle speed exceeds the second vehicle speed corresponding to an upshift from the current gear ratio, and for commanding a change to a lower gear ratio from the current gear ratio if the current vehicle speed exceeds the second vehicle speed corresponding to a downshift from the current gear ratio; and means responsive to the commanded change in gear ratio for changing the state of shift valves and friction elements to a state that produces the commanded gear ratio.

2. The system of claim 1 further comprising:

a torque converter driveably connecting the engine and transmission having a bypass clutch adapted to be unlocked, whereby the engine and transmission are hydrodynamically coupled, and locked, whereby the engine and transmission are mechanically coupled and/or slipping;

means for establishing a third vehicle speed corresponding to the current throttle position at which the bypass clutch is scheduled to lock in each gear ratio when the vehicle is in the reference mode of operation CCXLN, and for establishing the difference between said third vehicle speed and the vehicle speed corresponding to the current throttle position at which the bypass clutch is scheduled to lock in each gear ratio when the vehicle is in the second mode of operation CCXLP;

means for calculating a fourth vehicle speed corresponding to bypass pass locks in each gear ratio from the relation [CCXLN+(PWF*CCXLP)]; and means for commanding the bypass clutch to lock if the current vehicle speed exceeds the fourth vehicle speed.

3. The system of claim 2 further comprising;

means for establishing a fifth vehicle speed corresponding to the current throttle position at which the bypass clutch is scheduled to unlock in each gear ratio when the vehicle is in the reference mode of operation CCXUN, and for establishing the difference between said fifth vehicle speed and the vehicle speed corresponding to the current throttle position at which the bypass clutch is scheduled to unlock in each gear ratio when the vehicle is in the second mode of operation CCXUP;

means for calculating a sixth vehicle speed corresponding to bypass pass unlocks in each gear ratio from the relation [CCXUN+(PWF*CCXUP)]; and means for commanding the bypass clutch to lock if the current vehicle speed exceeds the fourth vehicle speed.

4. The system of claim 1 further comprising:

a torque converter driveably connecting the engine and transmission having a bypass clutch adapted to be unlocked, whereby the engine and transmission are hydrodynamically coupled, and locked, whereby the engine and transmission are mechanically coupled and/or slipping;

means for establishing a third vehicle speed corresponding to the current throttle position at which the bypass clutch is scheduled to lock in each gear ratio when the vehicle is in the reference mode of operation CCXLN, and for establishing the difference between said third vehicle speed and the vehicle speed corresponding to the current throttle position at which the bypass clutch is scheduled to lock in each gear ratio when the vehicle is in the second mode of operation CCXLP;

means for calculating a fourth vehicle speed corresponding to bypass pass locks in each gear ratio from the relation [CCXLN+(PWF*CCXLP)];

means for commanding the bypass clutch to lock if the current vehicle speed exceeds the fourth vehicle speed;

means for establishing a fifth vehicle speed corresponding to the current throttle position at which the bypass clutch is scheduled to unlock in each gear ratio when the vehicle is in the reference mode of operation CCXUN, and for establishing the difference between said fifth vehicle speed and the vehicle speed corresponding to the current throttle position at which the bypass clutch is scheduled to unlock in each gear ratio when the vehicle is in the second mode of operation CCXUP;

means for calculating a sixth vehicle speed corresponding to bypass pass unlocks in each gear ratio from the relation [CCXUN+(PWF*CCXUP)]; and means for commanding the bypass clutch to lock if the current vehicle speed exceeds the fourth vehicle speed.

5. A system for controlling gearshifts in an automatic, multiple gear ratio transmission for an automotive vehicle having an engine controlled by the position of an engine throttle, comprising:

multiple ratio gearing and pressure-actuated friction elements selectively engaged and released to produce multiple gear ratios through said gearing;

a pressurized valve system having multiple shift control valves for selectively engaging and releasing said friction elements;

solenoid valve means in said circuit for distributing selectively to said shift control valves a fluid pressure signal actuating said friction elements;

an electronic processor having a memory accessible to the processor, the memory containing predetermined performance weighting factors PWF having values associated with paired combinations of the current throttle position and current time rate of change of throttle position;

means communicating with said processor for generating a throttle position signal representing the current position of the engine throttle;

means communicating with said processor for generating a vehicle speed signal representing current vehicle speed;

means communicating with said processor for generating a gear signal representing the currently engaged gear ratio;

the processor having means for determining the time rate of change of the throttle;

means for establishing first vehicle speeds FNXXN corresponding to the current throttle position at which gear ratio changes are scheduled to occur from each gear ratio when the vehicle is in a reference mode of operation, and for establishing the difference FNXXP between said first vehicle speeds and the vehicle speeds corresponding to the current throttle position at which gear ratio changes are scheduled to occur from each gear ratio when the vehicle is in a second mode of operation;

means for calculating second vehicle speeds corresponding to upshifts and downshifts from the current gear ratio from the relation [FNXXN+(PWF*FNXXP)];

means for commanding a change to a higher gear ratio from the current gear ratio if the current vehicle speed exceeds the second vehicle speed corresponding to an upshift from the current gear ratio, and for commanding a change to a lower gear ratio from the current gear ratio if the current vehicle speed exceeds the second vehicle speed corresponding to a downshift from the current gear ratio; and means for energizing and deenergizing the solenoid valve means to produce the commanded gear ratio change selectively engaging and releasing the friction elements.

6. The system of claim 5, further comprising:

a torque converter driveably connecting the engine and transmission having a bypass clutch adapted to be unlocked, whereby the engine and transmission are hydrodynamically coupled, and locked, whereby the engine and transmission are mechanically coupled and/or slipping;

the processor having means for establishing a third vehicle speed corresponding to the current throttle position at which the bypass clutch is scheduled to lock in each gear ratio when the vehicle is in the reference mode of operation CCXLN, and for establishing the difference between said third vehicle speed and the vehicle speed corresponding to the current throttle position at which the bypass clutch is scheduled to lock in each gear ratio when the vehicle is in the second mode of operation CCXLP; and means for calculating a fourth vehicle speed corresponding to bypass pass locks in each gear ratio from the relation [CCXLN+(PWF*CCXLP)]; and means for commanding the bypass clutch to lock if the current vehicle speed exceeds the fourth vehicle speed.

7. The system of claim 6, the processor having means for establishing a fifth vehicle speed corresponding to the current throttle position at which the bypass clutch is scheduled to unlock in each gear ratio when the vehicle is in the reference mode of operation CCXUN, and for establishing the difference between said fifth vehicle speed and the vehicle speed corresponding to the current throttle position at which the bypass clutch is scheduled to unlock in each gear ratio when the vehicle is in the second mode of operation CCXUP; and means for calculating a sixth vehicle speed corresponding to bypass pass unlocks in each gear ratio from the relation [CCXUN+(PWF*CCXUP)]; and means for commanding the bypass clutch to lock if the current vehicle speed exceeds the fourth vehicle speed.

8. The system of claim 5 further comprising:

a torque converter driveably connecting the engine and transmission having a bypass clutch adapted to be unlocked, whereby the engine and transmission are hydrodynamically coupled, and locked, whereby the engine and transmission are mechanically coupled and/or slipping;

the processor having means for establishing a third vehicle speed corresponding to the current throttle position at which the bypass clutch is scheduled to lock in each gear ratio when the vehicle is in the reference mode of operation CCXLN, and for establishing the difference between said third vehicle speed and the vehicle speed corresponding to the current throttle position at which the bypass clutch is scheduled to lock in each gear ratio when the vehicle is in the second mode of operation CCXLP;

means for calculating a fourth vehicle speed corresponding to bypass pass locks in each gear ratio from the relation [CCXLN+(PWF*CCXLP)];

means for commanding the bypass clutch to lock if the current vehicle speed exceeds the fourth vehicle speed;

means for establishing a fifth vehicle speed corresponding to the current throttle position at which the bypass clutch is scheduled to unlock in each gear ratio when the vehicle is in the reference mode of operation CCXUN, and for establishing the difference between said fifth vehicle speed and the vehicle speed corresponding to the current throttle position at which the bypass clutch is scheduled to unlock in each gear ratio when the vehicle is in the second mode of operation CCXUP; and means for calculating a sixth vehicle speed corresponding to bypass pass unlocks in each gear ratio from the relation [CCXUN+(PWF*CCXUP)]; and means for commanding the bypass clutch to lock if the current vehicle speed exceeds the fourth vehicle speed.

* * * * *